US012409850B2

(12) United States Patent
Zhu et al.

(10) Patent No.: US 12,409,850 B2
(45) Date of Patent: Sep. 9, 2025

(54) SAFETY AND CRITICAL INFORMATION LOGGING MECHANISM FOR VEHICLES

(71) Applicant: Mobileye Vision Technologies Ltd., Jerusalem (IL)

(72) Inventors: Qianying Zhu, Beijing (CN); Lidan Zhang, Beijing (CN); Xiangbin Wu, Beijing (CN); Xinxin Zhang, Beijing (CN); Fei Li, Beijing (CN)

(73) Assignee: Mobileye Vision Technologies Ltd., Jerusalem (IL)

( * ) Notice: Subject to any disclaimer, the term of this patent is extended or adjusted under 35 U.S.C. 154(b) by 35 days.

(21) Appl. No.: 18/033,934

(22) PCT Filed: Nov. 19, 2021

(86) PCT No.: PCT/IB2021/000802
§ 371 (c)(1),
(2) Date: Apr. 26, 2023

(87) PCT Pub. No.: WO2022/106894
PCT Pub. Date: May 27, 2022

(65) Prior Publication Data
US 2023/0391360 A1    Dec. 7, 2023

(51) Int. Cl.
*B60W 60/00*    (2020.01)
(52) U.S. Cl.
CPC ..... *B60W 60/001* (2020.02); *B60W 2420/403* (2013.01); *B60W 2520/12* (2013.01); *B60W 2554/4041* (2020.02)
(58) Field of Classification Search
CPC ............. B60W 60/0059; B60W 40/06; B60W 40/105; B60W 60/0015; B60W 60/0053; B60W 60/0057
See application file for complete search history.

(56) References Cited

U.S. PATENT DOCUMENTS 9,122,948 B1 * 9/2015 Zhu .................... G06T 7/521
10,713,502 B2 * 7/2020 Tiziani ................ H04H 20/59
(Continued)

FOREIGN PATENT DOCUMENTS

CN    116867696    10/2023
CN    117818623    4/2024
(Continued)

OTHER PUBLICATIONS

"International Application Serial No. PCT/IB2021/000802, International Search Report mailed Mar. 15, 2022", 2 pgs.
(Continued)

*Primary Examiner* — Redhwan K Mawari
(74) *Attorney, Agent, or Firm* — Schwegman Lundberg & Woessner, P.A.

(57) ABSTRACT

Various aspects of methods, systems, and use cases for safety logging in a vehicle are described. In an example, an approach for data logging in a vehicle includes use of logging triggers, public and private data buckets, and defined data formats, for data provided during autonomous vehicle operation. Data logging operations may be triggered in response to safety conditions, such as detecting a dangerous situation from a failure of the vehicle to comply with safety criteria of a vehicle operational safety model. Data logging operations may include logging data in response to detection of the dangerous situation, including storage of a first portion of data in a public data store, and storage of a second portion of privacy-sensitive data in a private data store, where the data stored in the private data store is encrypted, and where access to the private data store is controlled.

20 Claims, 6 Drawing Sheets

(56) References Cited

U.S. PATENT DOCUMENTS

| | | | |
|---|---|---|---|
| 11,238,672 B2* | 2/2022 | Mallela | G08G 1/207 |
| 2019/0188493 A1* | 6/2019 | Tiziani | G05D 1/0214 |
| 2020/0017117 A1 | 1/2020 | Milton | |
| 2020/0051346 A1 | 2/2020 | Zhang et al. | |
| 2020/0108825 A1* | 4/2020 | Kim | G06V 20/58 |
| 2020/0112765 A1* | 4/2020 | Slipko | H04N 21/44004 |
| 2021/0209388 A1* | 7/2021 | Ciftci | G06N 3/045 |
| 2021/0294342 A1* | 9/2021 | Marasigan | G08G 1/096791 |
| 2022/0350335 A1* | 11/2022 | Reschka | G05D 1/0088 |

FOREIGN PATENT DOCUMENTS

| | | |
|---|---|---|
| DE | 112021005570 | 8/2023 |
| WO | 9713208 | 4/1997 |
| WO | WO-2018033874 A1 | 2/2018 |
| WO | WO-2018111606 A1 | 6/2018 |
| WO | WO-2022106894 A1 | 5/2022 |

OTHER PUBLICATIONS

"International Application Serial No. PCT/IB2021/000802, Written Opinion mailed Mar. 15, 2022", 4 pgs.

"European Application Serial No. 21894104.5, Response filed Mar. 21, 2025 to Extended European Search Report mailed Sep. 6, 2024", 16 pgs.

"International Application Serial No. PCT IB2021 000802, International Preliminary Report on Patentability mailed Jun. 1, 2023", 6 pgs.

"European Application Serial No. 21894104.5, Response to Communication Pursuant to Rules 161 and 162 filed Nov. 21, 2023", 11 pgs.

"European Application Serial No. 21894104.5, Extended European Search Report mailed Sep. 6, 2024", 10 pgs.

\* cited by examiner

SAFETY AND CRITICAL INFORMATION LOGGING MECHANISM FOR VEHICLES

PRIORITY CLAIM

This application is a U.S. National Stage Application under 35 U.S.C. 371 from International Application No. PCT/IB2021/000802, filed Nov. 19, 2021, and published as WO 2022/106894 on May 27, 2022, which claims the benefit of priority to International Application No. PCT/CN2020/130242, filed Nov. 19, 2020, which are incorporated herein by reference in their entirety.

BACKGROUND

Existing approaches for vehicle operation logging and data capture have encountered a variety of limitations. For example, some autonomous vehicles (e.g., Tesla vehicles which use "TeslaLog") use a log mechanism to capture real time data from the vehicle, and then the logged data can be uploaded to a remote cloud system for later analysis. Additionally, some autonomous driving companies and research institutions use specific vehicles equipped with an on-board data acquisition system to collect high-accuracy vehicle kinematics during daily driving.

However, as is also encountered in many logging systems for computer software, these approaches capture and output a significant amount of related system inputs and outputs, plus internal status, usually in text (and unstructured, unsecured) format. As a result, such existing approaches produce large volumes of data that is not fully useful for analysis and review of many real-world events.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
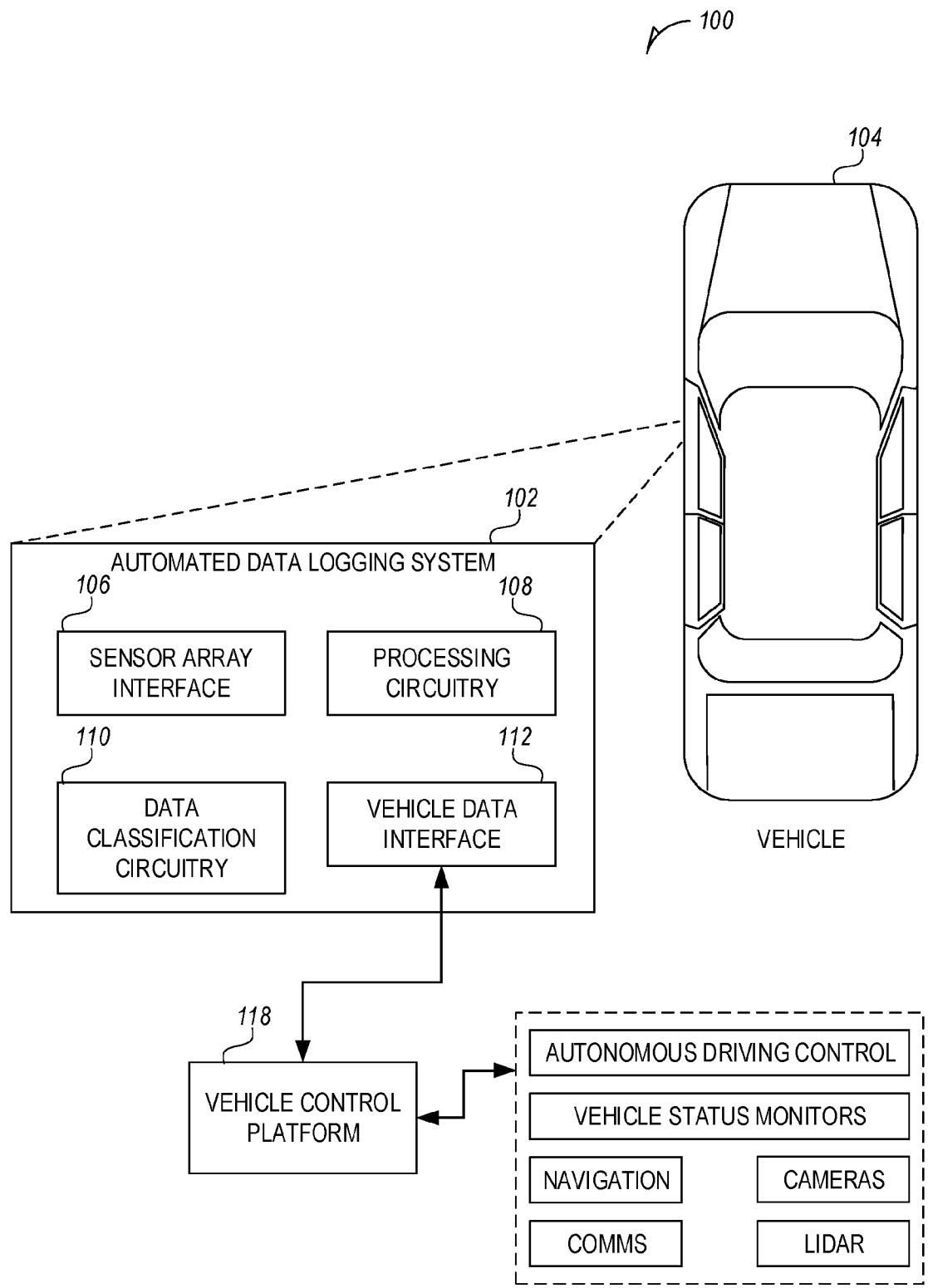
FIG. 1 illustrates a system to provide vehicle data logging, according to an example.

The following embodiments generally relate to mechanisms and techniques for establishing logging data from vehicle operations. Specifically, safety information and other critical information from various vehicle sensors and subsystems may be logged in a secure and private manner using the present techniques.

The logging of vehicle performance and internal operation data is required in a variety of scenarios, including in compliance testing scenarios, or in normal daily usage when proof or verification of vehicle operation is needed (e.g. during compliance testing verification, or when the vehicle was involved in an accident). To achieve this goal, proper availability of any important information, in good resolution, must be provided. Additionally, such information must be protected, with sound integrity, non-repudiation, and elimination of non-necessary information to protect customer privacy.

The following provides an overview of a structured logging system, providing defined logging operations and data capture characteristics. The result of such structured logging is easier to compare across vehicle systems and manufacturers, while ensuring protection and integrity, and being friendly to real-time online logging, yet privacy aware and undeniable.

The following structured logging operations also can provide a baseline for safety-related critical information logging in addition to debugging, to be used by regulation bodies, an industry consortium, etc. The following structured logging operations are established with a privacy aware approach, with appropriate protection of information integrity. Additionally, this provides resistance to intentional or unintentional modification.

With existing approaches, logging of autonomous vehicle operations is performed in a very temporary and incomplete way. Sometimes too much information is logged, while other times, there is missing critical information to improve the overall system. Existing approaches for autonomous vehicle logging often capture data that is casual and not structured. Extra work (e.g. a log analysis software) is then needed to compare different logs from different versions of software from the same vehicle, or from different vehicles, or different vendors. Additionally, there is often a lack of comparison baseline, so some needed log information might be missing for compliance testing, while other log information might not be necessary, thus causing extra privacy exposure risks. Likewise, logging may be performed with different resolutions (e.g., timing or frequency of data captures).

Additionally, existing approaches also lack important features such as integrity protection and validation, and can be modified easily and can degrade the overall value of logging. Existing approaches also have an overall lack of differentiation to handle different information sensitivities (e.g., weather conditions vs. geographic location of the vehicle) for different protection levels. Likewise, there are a lack of capabilities such as simultaneous online logging thru wireless communication. These and other limitations are addressed through the following data logging platform and data logging operations, introduced with an on-vehicle data processing example.

FIG. 1 is a schematic drawing illustrating a system 100 to provide vehicle data logging, according to an embodiment. FIG. 1 includes an automated data logging system 102 incorporated into the vehicle 104. The automated data logging system 102 includes a sensor array interface 106, processing circuitry 108, data classification circuitry 110, and a vehicle data interface 112. The illustration of system 100 provides a simplified portrayal of the vehicle 104 and vehicle operations; it will be understood that many vehicle subsystems are not illustrated for purposes of simplicity. In other examples, the automated data logging system is a standalone device for use in the vehicle 104, and is not directly in The vehicle 104, which may also be referred to as an "ego vehicle", "subject vehicle", or "host vehicle", may be any type of vehicle, such as a commercial vehicle, a consumer vehicle, a recreation vehicle, a car, a truck, a motorcycle, a boat, a drone, a robot, an airplane, a hovercraft, or any mobile craft able to operate at least partially in an autonomous mode. The vehicle 104 may operate at some times in a manual mode where the driver operates the vehicle 104 conventionally using pedals, a steering wheel, or other controls. At other times, the vehicle 104 may operate in a fully autonomous mode, where the vehicle 104 operates without user intervention. In addition, the vehicle 104 may operate in a semi-autonomous mode, where the vehicle 104 controls many of the aspects of driving, but the driver may intervene or influence the operation using conventional (e.g., steering wheel) and non-conventional inputs (e.g., voice control). In this fashion, the vehicle may operate at the same or different times among any number of driving automation levels, defined from Level 1 to Level 5 (e.g., as defined by SAE International J3016: Level 1, Driver Assistance; Level 2, Partial Driving Automation; Level 3, Conditional Driving Automation; Level 4, High Driving Automation; Level 5, Full Driving Automation).

The sensor array interface 106 may be used to provide input or output signaling to the automated data logging system 102, to receive or obtain data from one or more sensors of a sensor array installed on (e.g., within) the vehicle 104. Examples of sensors include, but are not limited to: forward, side, or rearward facing cameras; radar; LiDAR; ultrasonic distance measurement sensors; or other sensors. Forward-facing or front-facing is used in this document to refer to the primary direction of travel, the direction the seats are arranged to face, the direction of travel when the transmission is set to drive, or the like. Conventionally then, rear-facing or rearward-facing is used to describe sensors that are directed in a roughly opposite direction than those that are forward or front-facing. It is understood that some front-facing cameras may have a relatively wide field of view, even up to 180-degrees. Similarly, a rear-facing camera that is directed at an angle (perhaps 60-degrees off center) to be used to detect traffic in adjacent traffic lanes, may also have a relatively wide field of view, which may overlap the field of view of the front-facing camera. Side-facing sensors are those that are directed outward from the sides of the vehicle 104. Cameras in the sensor array may include infrared or visible light cameras, able to focus at long-range or short-range with narrow or large fields of view. The vehicle 104 may also include various other sensors, such as driver identification sensors (e.g., a seat sensor, an eye tracking and identification sensor, a fingerprint scanner, a voice recognition module, or the like), occupant sensors, or various environmental sensors to detect wind velocity, outdoor temperature, barometer pressure, rain/moisture, or the like.

Sensor data is used to determine the vehicle's operating context, environmental information, road conditions, travel conditions, or the like. The sensor array interface 106 may communicate with another interface, such as an onboard navigation system of the vehicle 104 to provide or obtain sensor data. Components of the automated data logging system 102 may communicate with components internal to the automated data logging system 102 or components that are external to the system 102 using a network, which may include local-area networks (LAN), wide-area networks (WAN), wireless networks (e.g., IEEE 802.11 (Wi-Fi) or cellular network), ad hoc networks, personal area networks (e.g., Bluetooth), vehicle-based networks (e.g., Controller Area Network (CAN) BUS), or other combinations or permutations of network protocols and network types. The network may include a single local area network (LAN) or wide-area network (WAN), or combinations of LANs or WANs, such as the Internet. The various devices coupled to the network may be coupled to the network via one or more wired or wireless connections.

The automated data logging system 102 may communicate with a vehicle control platform 118 using a vehicle data interface 112, to receive and obtain vehicle data. The vehicle control platform 118 may be a component of a larger architecture that controls various aspects of the vehicle's operation. The vehicle control platform 118 may have interfaces to autonomous driving control systems (e.g., steering, braking, acceleration, etc.), comfort systems (e.g., heat, air conditioning, seat positioning, etc.), navigation interfaces (e.g., maps and routing systems, positioning systems, etc.), collision avoidance systems, communication systems, security systems, vehicle status monitors (e.g., tire pressure monitor, oil level sensor, battery level sensor, speedometer, etc.), and the like. The vehicle control platform 118 may control or monitor one or more subsystems, and communicate data from such subsystems to the automated data logging system 102. In some examples, features of the sensor array interface 106 and the vehicle data interface 112 are integrated into a same or coordinated data collection interface, to receive data from at least one sensing component of the vehicle. Such data may be provided via the interface(s) during autonomous operation of the vehicle, and such data may be automatically logged using the approaches discussed herein.

In an example, sensor data, such as braking, throttle, speed data signals, among other data signal types, may be provided to the data classification circuitry 110, which may preprocess the input signals. The data classification circuitry 110 may include various rules, algorithms, or logic, including one of several types of machine learning, such as artificial neural networks (ANN), support vector machines (SVM), Gaussian mixture model (GMM), deep learning, or the like. Based on the possible classification, the processing circuitry 108 may initiate one or more responsive data processing, logging, or communication activities. Other autonomous vehicle and data processing actions may be monitored, coordinated, or initiated depending on the type, severity, location, or other aspects of an event detected with the automated data logging system 102.

In an example, the automated data logging system 102 may be activated or triggered in various settings. For example, a "Always On" trigger, may cause all logging operations to be turned on and run in all scenarios; a "Normal use" trigger may cause no logging to occur until triggered by some internal status, such as when a safety operation minimum distance (e.g., a minimum longitudinal or minimum lateral distance between the host vehicle and a target vehicle, using distance defined by a vehicle operation safety model such as Responsibility Sensitive Safety (RSS) from Mobileye) cannot be maintained until no internal trigger is on plus certain minutes (e.g., 2 minutes) of delay. Other forms of data triggering and activation may also be provided.

Also in an example, the automated data logging system 102 provides two logging data stores ("buckets") to collect data for a vehicle: a "General" or "Public" bucket and a "Private" bucket. Such buckets may be implemented in the same or different storage devices (e.g., non-volatile memory). These log buckets are operated in sync (using the same time stamp as events happen in parallel). The Public log bucket is provided to log events with no special access control restrictions, whereas the Private log bucket is provided to log events with access control restrictions. For example, the Private log bucket may maintain privileged or privacy-sensitive information, such as: geographic location, driver information, camera data, or other information requiring additional protection as defined by developers, users, manufacturers, etc. A user (e.g., human driver) may also be provided with a choice to select or disable the Private log buckets or the types of protected data in a system configuration. For instance, a user may select among choices of "Privacy Protection On" or "Privacy Protection Disabled"; a default choice that is used in the vehicle may be "Privacy Protection On".

If the data logging trigger is manually turned on (activated), this trigger overrides other settings and turns on logging for all data buckets, until the data logging trigger is manually turned off. Such an activation may be associated with an online logging mode. When online logging is configured, each log block is sent to a backend system (e.g., a cloud service) immediately when the block of data (or, a buffered set of data blocks) is ready.

Various forms of security and encryption may be used to keep logging information confidential. For example, online logs can be encrypted by using an online log service provider's public key. For instance, a service provider can be a regulator body, insurance provider for the vehicle, the vehicle vendor, operator, or some trusted third party. Other forms of security and encryption may also be applied to communications involving the logging information.

Virtual logging can be provided by a "Virtual Log" to provide a concise context at event log starting. To log necessary context info, the system will also need logs to provide data from a short period (e.g., 2 minutes) before an internal trigger is activated, which can be assisted by the Virtual Log. For instance, all system data may be automatically buffered and logged into one or more Virtual Logs, regardless of the status of the triggers. In an example, the virtual logs are automatically truncated to contain only a most recent set period of log data (e.g., 2 minutes of data).

Virtual logs preferably are maintained in memory with appropriate protection (e.g. encryption). When a log trigger is on, the virtual logs of data are maintained for the last data collection period (e.g., the last 2 minutes of data) and are automatically classified into certain log buckets or categories before logging is triggered. Other triggering and data capture possibilities may also be incorporated.

To enable a comparison of AV operational data provided from vehicles of different types and manufacturers, a common logging approach and data structure may be defined among multiple vehicles as follows. First, the data is stored at each vehicle in a public data bucket (e.g., the public data store 212 of FIG. 2) or a private data bucket (e.g., the private data store 214 of FIG. 2) according to the privacy or personally-identifying characteristics of the data. Second, relevant data for the private data bucket is stored at each vehicle in an encrypted manner, and the access is controlled. For instance, an encryption algorithm used for the private data bucket may be chosen or implemented by the vehicle manufacturer to protect the private data.

In an example, the following logging format (data structure) may be utilized for the collection of AV operational data. In every specified interval (e.g., 10 milliseconds), the vehicle logs the following information into the two data buckets: the "Public" or "General" data bucket using the first data structure defined in TABLE 1, and the "Private" data bucket using the second data structure defined in TABLE 2.

TABLE 1

Public (General) Data Bucket

| Data Field Name | Data Field Description | Data Length |
|---|---|---|
| Item sequence | Serial number of the log, consisting of ASCII code (e.g., "ITEM" and serial number) | ASCII code: 32 bit Serial number: 32 bit |
| Timestamp | Timestamp | 64 bit |
| Vehicle ID | Vehicle identifier (e.g., defined by the manufacturer) | 64 bit |
| Ego Vehicle Longitudinal Speed | The longitudinal speed of the test vehicle (e.g., in km/h) | 64 bit |
| Ego Vehicle Lateral Speed | The lateral speed of the test vehicle (e.g., in km/h) | 64 bit |
| Lane position | The lane information of the test vehicle (e.g., following ASAM OpenDRIVE definitions) For the lane in the same direction: 1: the innermost lane 2: the secondary inner lane ... For the lane in the opposite direction: −1: the innermost lane −2: the secondary inner lane ... | 16 bit |
| Throttle | The current throttle signal of the test vehicle | Double, 64 bit |
| Brake | The current braking signal of the test vehicle | Double, 64 bit |
| Steering | The current steering of the test vehicle | Double, 64 bit |
| Inertial | The posture information, including: Δx: acceleration in the x-axis direction (m/s$^2$) Δy: acceleration in the y-axis direction (m/s$^2$) Δz: acceleration in the z-axis direction (m/s$^2$) Δpitch: angular acceleration in the x-axis direction (rad/s) Δroll: angular acceleration in the y-axis direction (rad/s) Δyaw: angular acceleration in the z-axis direction (rad/s) | Double, 64 bit (×6) |
| Parameter table index | Index of the safety decision parameter table (e.g., identified from a safety decision parameter table, such as the parameter table provided in TABLE 4, below; the pointer may be 0 when there is only one set of parameters) | integer_index, 16 bit |
| Actuated | A Boolean value that indicates whether the vehicle has entered a dangerous situation (e.g., indicated by the vehicle safety operation model) | True or False |
| Target vehicle Longitudinal Speed | The current longitudinal speed of the target vehicle (km/h) | 64 bit |
| Target vehicle Lateral Speed | The current lateral speed of the target vehicle (km/h) | 64 bit |
| Longitudinal Distance to Target | The relative longitudinal distance to the target vehicle | Double, 64 bit |
| Longitudinal Distance to Target | The relative lateral distance to the target vehicle | Double, 64 bit |

TABLE 2

Private Data Bucket

| Data Field Name | Data Field Description | Length |
| --- | --- | --- |
| Item sequence | Serial number of the log, consisting of ASCII code (e.g., "ITEM" and serial number) | ASCII code: 32 bit serial number: 32 bit |
| Timestamp | Timestamp | 64 bit |
| Vehicle ID | Vehicle identifier (e.g., defined by the manufacturer) | 64 bit |
| Driver ID | Driver identifier | 64 bit |
| Position longitude | The position longitude of the test vehicle | 64 bit |
| Position latitude | The position latitude of the test vehicle | 64 bit |
| Location method | Positioning methods:<br>GPS = 0 (Global Positioning System)<br>Diff-GPS = 1 (Differential Global Positioning System)<br>BeiDou = 2 (BeiDou Navigation Satellite System)<br>GLONASS = 3 (Globalnaya Navigazionnaya Sputnikovaya Sistema)<br>Galileo = 4 (European Union Global Navigation Satellite System)<br>QZSS = 5 (Quasi-Zenith Satellite System)<br>Inertial = 6 (e.g. tunnels) | integer, 16 bit |
| Picture from camera 1 | Data collected by camera 1, including the following fields:<br>Size: the length of the data (bytes)<br>Data: the collected data (Blob in JPEG format) | size: integer, 32 bit<br>data: size*8 bit |
| Picture from camera 2 | Data collected by camera 2 (e.g., including the fields indicated for camera 1) | size: integer, 32 bit<br>data: size*8 bit |
| ... | | |
| Picture from camera N | Data collected by camera N (e.g., including the fields indicated for camera 1) | size: integer, 32 bit<br>data: size*8 bit |

With such detailed logging information, a full context can be provided in a data log to rebuild what happened and led to an event (e.g., an accident or near miss), especially with safety model triggers. It will be understood that many downstream uses of the logging information may be provided, including in relation to testing, releasing and validating software versions, validating whether a vehicle passes a test, and to reconstruct data at accidents and identify what happened.

In an example, the safety model triggers are associated with thresholds or values (e.g., less than, more than) from specific safety decision parameters. Such safety decision parameters may be defined by (or required by) a particular vehicle operation safety model, such as RSS. Thus, determining whether a safety model trigger has been activated may include performing a comparison of the operation of the host vehicle to at least one requirement or evaluative criterion (e.g., and safety decision parameter values) specified by the vehicle operation safety model. In various examples, such safety decision parameters may relate to a minimum safe longitudinal distance, a minimum lateral safe distance, and other values determined from: the longitudinal or lateral response time of an ego vehicle; the maximum longitudinal or lateral acceleration of the ego vehicle; the minimum longitudinal or lateral braking deceleration of the ego vehicle; the maximum longitudinal deceleration of the target vehicle; and the like.

Figure 2:
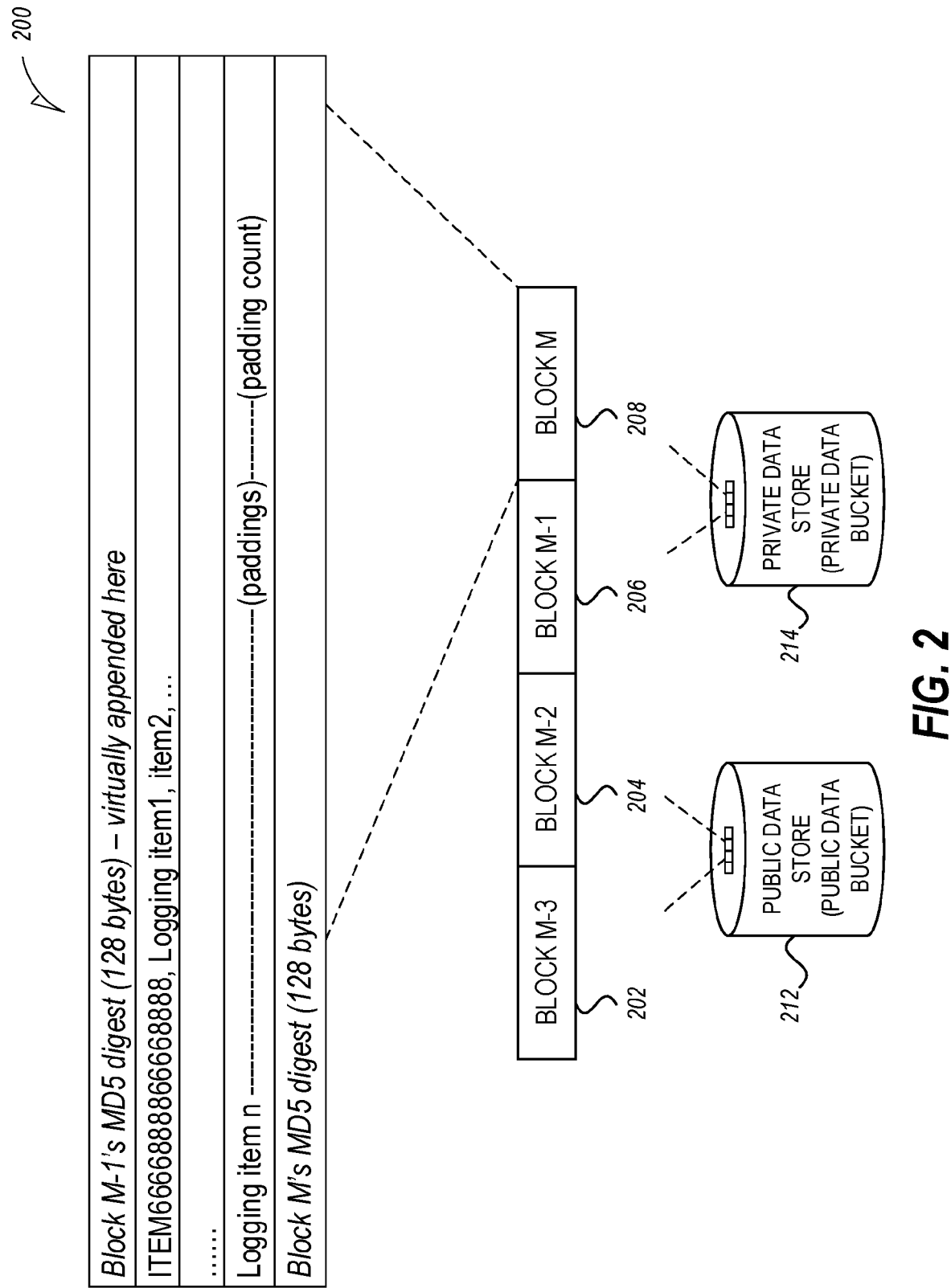
FIG. 2 illustrates a vehicle data logging format, according to an example.

FIG. 2 depicts a further example of a vehicle data logging format 200 for use with the vehicle data logging operations discussed herein. This data logging format 200 provides a standardized format in addition to integrity and non-repudiation for data entries. The vehicle data logging format 200 provides a definition of the data block used for both public data and private data. Here, a plurality of data blocks 202, 204, 206, 208 are linked together with digest values. Such data blocks may be used for storage of logging data in a public data store 212 and a private data store 214, for implementing the public data bucket and the private data bucket discussed above. For instance, storage of the logging data may include storage of a first portion of the sensor data (e.g., not privacy sensitive data values) in the public data store 212, and storage of a second portion of the sensor data (e.g., privacy sensitive data values) in the private data store 214. Various security techniques may be applied to the second portion of the sensor data hosted in the private data store 214. For instance, data stored in the private data store 214 may be encrypted, and access control measures may be provided to prevent unintended or unauthorized access to data in the private data store 214.

Various techniques can be applied to the data to ensure data integrity and prevent from tampering. For example, every n data record items (e.g., every 100 data record items) can be organized as a data block, corresponding to a 1024-bit MD5 digest information (e.g., the MD5 digest value of the previous data block needs to be included when calculating the current one). Each data block is an integer multiple of 128 bytes, otherwise it needs to be filled with a padding ("FF"), and the last byte is the length of the padding. The initial MD5 input of the first block is 128 byte, including the current time (64 bit), the root certificate of the vehicle (defined by the manufacturer), and the padding ('FF').

In a specific example, the data block is automatically ended when there is no new data written for 5 seconds. Other methods of organizing data into blocks or chunks may also be used.

The format definition used for both public data and private data logging (e.g., in the public data bucket and the private data bucket) may be implemented as follows:

TABLE 3

| Block M−1 |
| --- |
| ... |
| Block M−1 MD5 Abstract (128 byte) |
| Block M |
| |
| Log item 1 ("ITEM" + the serial number of the log . . .)<br>Log item 2 ("ITEM" + the serial number of the log . . .)<br>...<br>Log item 100 or n (corresponding to timeout) + (Padding) + (length of the string)<br>Block M MD5 Abstract (128 byte) |

Figure 3:
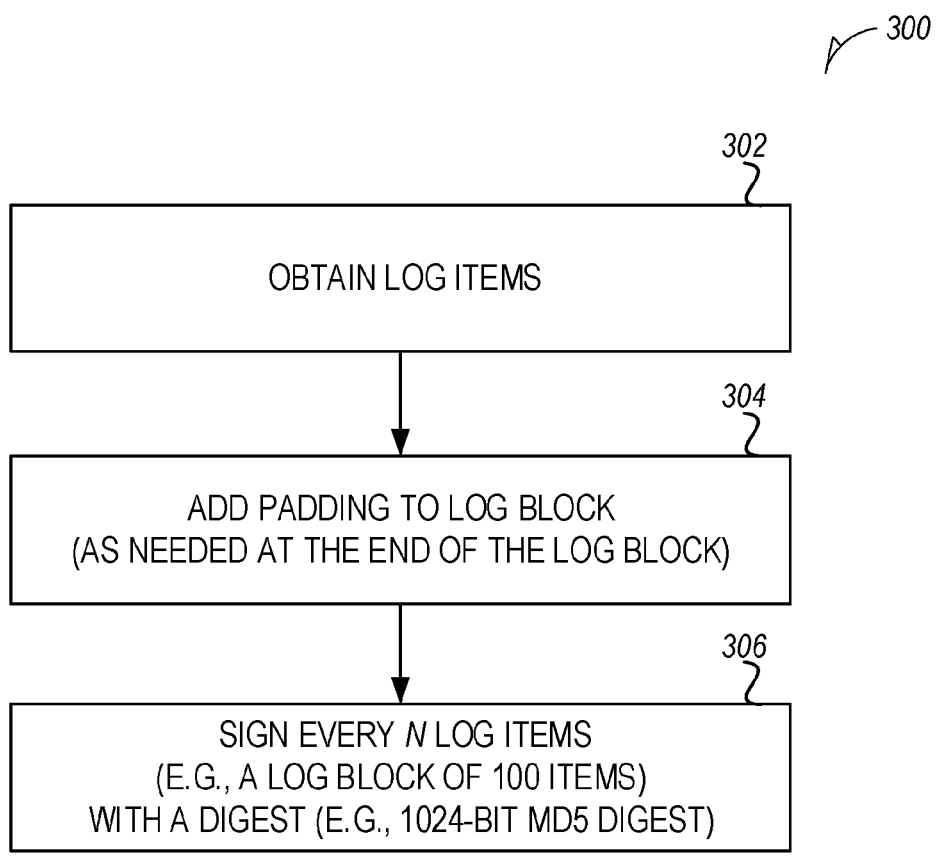
FIG. 3 illustrates a flowchart of a vehicle data logging method, according to an example.

FIG. 3 depicts a flowchart 300 of a vehicle data logging method, for use with the data logging operations discussed herein. This flowchart 300 begins by obtaining log items (operation 302). Each log block should be multiples of some defined value (e.g., 128 bytes). If not, padding is added at the end of the log block (operation 304). In an example, the last byte of padding is the number of bytes padded, and the last byte is counted as padding. The flowchart continues by signing every n log items (operation 306) with a digest. For example, every 100 log items, to be produced into a respective log block, may be signed with a 1024-bit MD5 digest. As depicted in the data logging format 200, the previous log block's MD5 digest may be put at the head of the data entry when calculating the new digest. As also depicted in the data logging format 200, this signature may be attached at the end of the block.

In an example, the MD5 digest of log block 0 can be generated from some known value, such as when engine starts using MD5_digest (Current Time 64 bit+Vehicle Root Certificate). Log block 1 is always saved into the buckets every time the vehicle started. Additionally, there may be a timeout (e.g., a five second time-out) when no log items in the bucket are available to form a log block. Other variations to the format and security features may also be implemented.

The logging and verification of specific safety model parameters relating to longitudinal or lateral distances, braking or deceleration conditions, acceleration or speed conditions, and the like, may be useful to help verify whether safety model rules and procedures were followed (or violated) by the vehicle or other entities in a driving scenario. As will be understood, each manufacturer may design, define, or calculate respective safety decision-making parameters for a vehicle, according to the physical characteristics of the vehicle, and the selection or specification of different parameters according to different environments that the vehicle is used in. A parameter table can be provided by the manufacturer that is set or defined according to the actual performance of the vehicle, and there can be one or several sets of parameters.

TABLE 4 below provides an example of parameters for safety decision-making, such as may be provided by or incorporated into a vehicle operational safety model, and used for evaluation or triggering of logging conditions. It will be understood that real-time values (such as accelerations) may be unsigned values which plugged in into the relevant safety modeling formulas.

TABLE 4

Safety Decision-Making Parameters

| Field Name | Field Meaning | Length |
|---|---|---|
| $\rho_{long}$ | The longitudinal response time of the ego vehicle (ms) | 16 bit |
| $\rho_{lateral}$ | The lateral response time of the ego vehicle (ms) | 16 bit |
| $a_{max, accel}^{long}$ | The maximum longitudinal acceleration of the ego vehicle (m/s$^2$) | Double, 64 bit |
| $a_{max, accel}^{lateral}$ | The maximum lateral acceleration of the ego vehicle (m/s$^2$) | Double, 64 bit |
| $a_{min, brake}^{long}$ | The minimum longitudinal braking deceleration of the ego vehicle (m/s$^2$) | Double, 64 bit |
| $a_{min, brake}^{lateral}$ | The minimum lateral braking deceleration of the ego vehicle (m/s$^2$) | Double, 64 bit |
| $a_{max, brake}^{long}$ | The maximum longitudinal deacceleration of the target vehicle (m/s$^2$) | Double, 64 bit |

Figure 4:
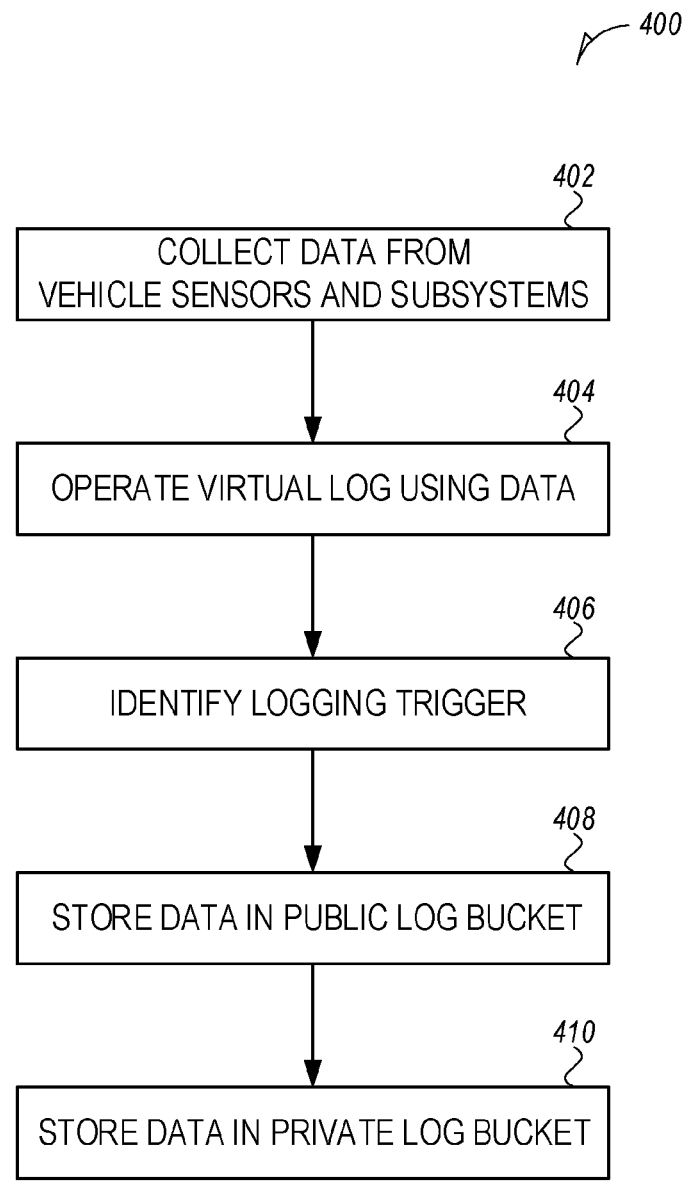
FIG. 4 illustrates a flowchart of a method for collecting and operating data logging for a vehicle, according to an example.

FIG. 4 depicts a flowchart 400 of a method for collecting and operating data logging for a vehicle, according to the present techniques.

Operation 402 includes collecting data from a plurality of sensors and subsystems of the autonomous vehicle. This data may include the data values identified with reference to Tables 1 and 2 above, and other data values discussed above.

Operation 404 includes establishing a virtual log (e.g., buffer) at the vehicle using the collected data, with the virtual log providing an ongoing log of the collected data for a defined window or period of time (e.g., the previous two minutes of data). The virtual log may be operated and maintained using the other aspects and approaches discussed above.

Operation 406 includes identifying a logging trigger from operation of the vehicle. This may include the triggers discussed above, such as based on a safety model trigger (e.g., detecting a distance that is below a minimum longitudinal safety distance or below a minimum lateral safety distance to another vehicle), the occurrence of an accident, a testing or validation event, or the like. Various safety model parameters, criteria, and requirements for the vehicle or the vehicle type (or other vehicles or entities on the roadway) may be considered and calculated as part of this operation.

Operation 408 includes storing data in a first log bucket, in response to identifying the logging trigger. The data stored in the first log bucket may be data for a "general" or "public" bucket, as discussed with reference to TABLE 1 above. The data for this first log bucket may be provided from sensor or operational data of the vehicle including the data established in the virtual log for the defined period of time (e.g., the previous two minutes of data). The data for this first log bucket may be stored according to a defined, structured data format (such as discussed with reference to FIGS. 2 and 3). Other approaches such as anonymization or obfuscation may also be used for the public data.

Operation 410 includes storing data in a second log bucket, in response to identifying the logging trigger. The data stored in the second log bucket may be data for a "private" bucket, and identified as private or sensitive data, as discussed with reference to TABLE 2 above. The data for this second log bucket may be provided from sensor or operational data of the vehicle including the data established in the virtual log for the defined period of time (e.g., the previous two minutes of data). The data for this second log bucket also may be stored according to a defined, structured data format (such as discussed with reference to FIGS. 2 and 3). The same data format or a similar format may be used for both the first log bucket and the second log bucket. Other privacy or security approaches or formats for the private data may also be provided.

As will be understood, the preceding techniques may be implemented in a variety of testing scenarios. This may include implementation in an autonomous vehicle for road test, in an autonomous vehicle which is equipped with automatic data logging devices. Such automatic data logging devices can be configured to record and store the status of the autonomous vehicle during the test.

In a further example, automatic data logging devices (e.g., integrated within or coupled to a vehicle) can automatically record and store vehicle logging data from at least 90 seconds before and 30 seconds after the events such as collisions, accidents, or the occurrence of out-of-self-driving or failure status. For instance, an automatic data logging device may be configured to store and maintain (persist) data for a long period of time, such as 1, 2, or 3 years.

Additionally, larger sets of data relating to the condition of the vehicle and vehicle operations may be collected and logged. Such data may be provided from supervisory data logging operations which are triggered or recorded based on the conditions discussed above (e.g., a violation of a safety driving requirement defined by a vehicle safety model), or other more specific conditions such as collisions, accidents, or system failures. In an example, vehicle condition data may include one or more of the following supervisory data values defined in the following table.

TABLE 5

SUPERVISORY DATA LOGGING VALUES

| | |
|---|---|
| Control mode of the AV | E.g., self-driving or manual-control |
| Location of the AV | |
| Motion state of the AV | E.g., velocity and acceleration |
| Perception of the environment and the response status | E.g. data of other traffic participants and obstacles |
| Real-time status of traffic components | E.g., status of traffic lights and signals |
| External video surveillance data | E.g., video surveillance around the AV |
| Internal video and voice surveillance data | E.g., in-car video and voice surveillance data reflecting the condition of the tester and the human-computer interaction |
| Non-Driver Control Commands | E.g., The non-driver seat control commands received by the vehicle and their sources, including control commands sent from other seats in the vehicle or remote test seats. |
| Fault condition | E.g., fault condition of the AV |
| Other data | |

For example, AVs may be equipped with a logging system to log the decision-making related data during a closed track test or an open road test, or for accidents analysis and decision-making safety analysis. All the data can be automatically recorded and stored from at least 90 seconds before and 30 seconds after the trigger of a dangerous situation, with at least 10 Hz sampling rate.

Data operations may be coordinated in connection with supervisory platforms and supervisory devices. For instance, a supervisory device can be equipped to upload real-time data (e.g., data values indicated in TABLE 5) to a supervisory platform. The supervisory devices can accept daily supervision from a third-party authorized agency.

Accordingly, any of the preceding logging operations may be triggered or controlled as a result of a detection of a "dangerous situation" (e.g., in response to events or conditions which trigger the dangerous situation) and other violations of safety model criteria or safety model requirements. It will be understood that a dangerous situation may be detected when the longitudinal and lateral distances between the two vehicles do not meet the requirement of a minimum safety distance. More precisely, a dangerous situation refers to a state triggered when the distance between a host and a target vehicle does not meet the requirement of minimum longitudinal safe distance and minimum lateral safe distance (e.g., defined or calculated according to specifications of the vehicle safety operational model), allowing the possibility of collision. Other situations and scenarios may also be detected.

Figure 5:
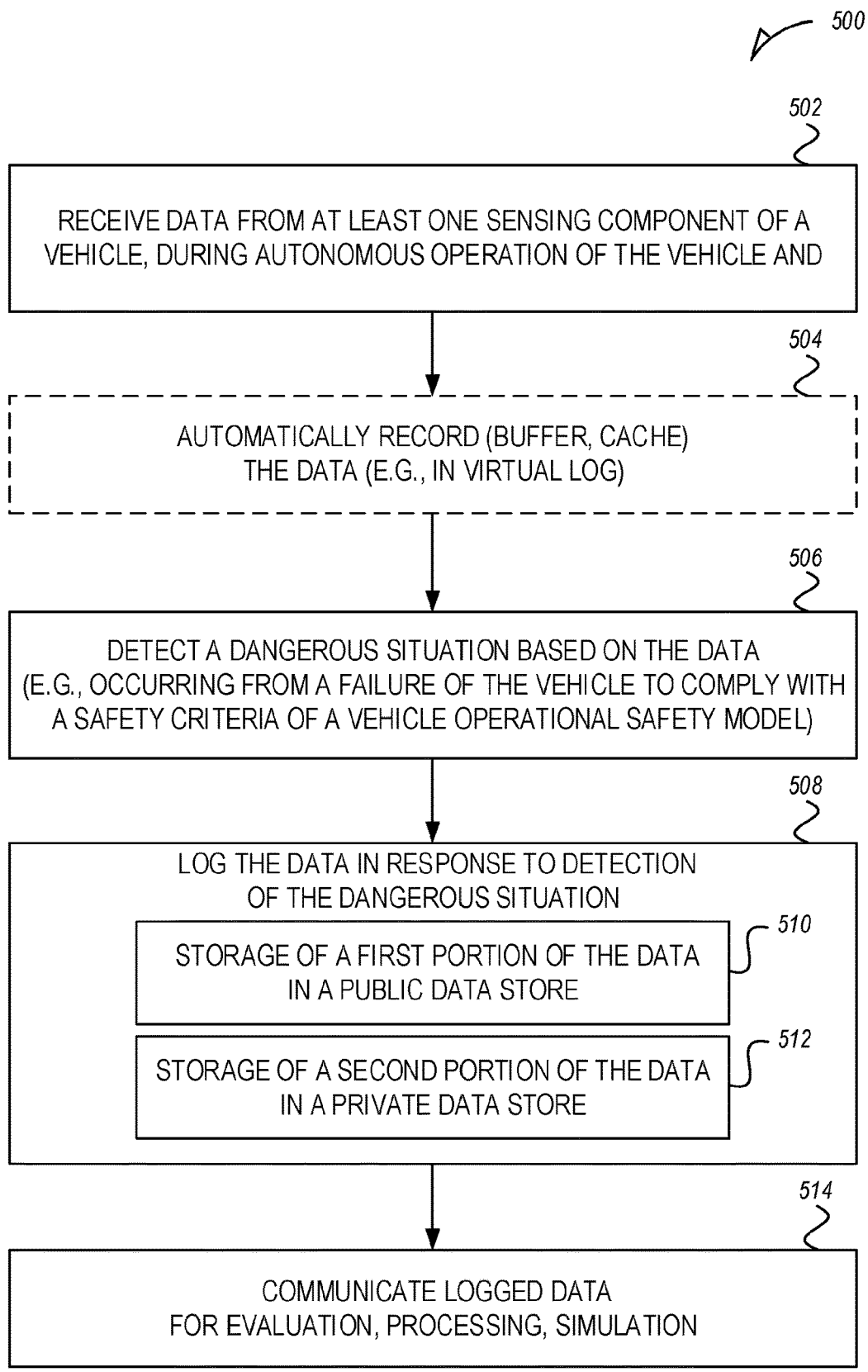
FIG. 5 illustrates a flowchart of a method performed at a vehicle for logging autonomous vehicle operation data values.

FIG. 5 illustrates a flowchart 500 of a method performed at a vehicle for logging autonomous vehicle operation data values. The operations of this method may be performed in a standalone device, a device integrated within or as part of a host or subject vehicle, as part of an automated data logging platform, as part of another monitoring or sensing device, or as part of instructions from a computing machine- or device-readable storage medium which are executed by circuitry of the computing machine or device.

At 502, operations are performed to receive and obtain data from at least one sensing component of a vehicle (e.g., an ego or host vehicle). For instance, such data may be received or captured using an interface (e.g., a sensor array interface, or a vehicle data interface) to one or more sensing components of the vehicle, for data provided during autonomous operation of the vehicle. In an example, the data from the at least one sensing component is used for safety decision-making by a planning system for the autonomous operation of the vehicle. Also in an example, the data may be captured (or, recorded) with at least a 10 Hz sampling frequency (e.g., 10 data samples per second).

At 504, operations are optionally performed to automatically record the data in a memory or storage, in a virtual log as discussed herein. For instance, the data obtained from the at least one sensing component may be automatically recorded with the use of a buffer or cache, to provide an ongoing data stream of available data for further monitoring and processing. Further, the data obtained from the at least one sensing component of the vehicle may be automatically recorded during at least a first period of time before a start of a dangerous situation (including, before detection of the dangerous situation), and automatically recorded during at least a second period of time after the start of the dangerous situation (including, after detection of the dangerous situation). In a specific example, the first period of time (before the start of the dangerous situation) is at least 90 seconds, and the second period of time (after the start of the dangerous situation) is at least 30 seconds. Other automatic data logging and capture operations may be performed.

At 506, operations are performed to detect a dangerous situation based on the data. For instance, this dangerous situation may occur from a failure of the vehicle to comply with at least one safety criteria of a vehicle operational safety model (e.g., a minimum safe distance, as defined by RSS or a similar safety model). In an example, the failure of the vehicle to comply with the safety criteria of the vehicle operational safety model is determined from the evaluation of at least one safety decision-making parameter. For instance, the at least one safety decision-making parameter may include at least one of: longitudinal response time of the vehicle; lateral response time of the vehicle; maximum longitudinal acceleration of the vehicle; maximum lateral acceleration of the vehicle; or minimum longitudinal braking deceleration of the vehicle (e.g., as defined with reference to TABLE 3, above). In a further example, a respective value for each of the at least one safety decision-making parameter is provided by a manufacturer of the vehicle.

At 508, operations are performed to the log the data, in response to detection or identification of the dangerous situation. This includes the use of sub-operations 510 for storage of a first portion of the data in a public data store, and sub-operations 512 for storage of a second portion of the data in a private data store, as discussed above. In an example, the data is logged in the public data store according to a first data structure and in the private data store according to a second data structure (e.g., provided in TABLE 1 and TABLE 2, above), and the data structures include at least some common data fields. For instance, the first and second data structures may each include common data fields for a time stamp and a vehicle identifier.

At 510, in a specific example, storage of data (the first portion of the data from the sensing components) in the public data store includes data values from at least one of: longitudinal speed of the vehicle; lateral speed of the vehicle; lane position of the vehicle; throttle state of the vehicle; braking state of the vehicle; steering state of the vehicle; or posture state of the vehicle. At 512, in a specific example, storage of data (the second portion of the data from the sensing components) in the private data store includes at least one of: geographic position data of the vehicle; or camera data collected by at least one camera of the vehicle.

At 514, operations are performed to communicate the logged data for further evaluation or processing (including, the creation of simulations and test verification/validation operations). Such operations may include communications of the logged data to a remote server or system, including security operations or procedures to enable the protection of the privacy-sensitive data logged in the private data store. Accordingly, it will be understood that the logged data may be useful for the evaluation of a variety of closed track test and the open road tests, including for performing accident analysis and decision-making safety analysis.

It will be understood that a variety of dangerous (or potentially dangerous) situations relating to safe distance or other safety criteria may be evaluated. For instance, in a further example, the dangerous situation may relate to a minimum safe distance requirement between the vehicle and a target vehicle, such that the first portion of the data stored in the public data store includes values for at least one of: longitudinal speed of the target vehicle; lateral speed of the target vehicle; longitudinal distance from the vehicle to the target vehicle; or lateral distance from the vehicle to the target vehicle. Other sensed data values from a host vehicle's environment relating to the roadway, other vehicles, sensed objects or persons, etc., may be evaluated and recorded.

Although flowchart 500 is described from the perspective of a vehicle (client), corresponding data processing operations to receive and analyze the results of the data logging may be performed on a server platform. Such operations may be performed in a standalone computing device, a monitoring system integrated within or as part of a data processing cloud, edge computing platform, or data center, as part of an automated data processing system, or as part of instructions from a computing machine- or device-readable storage medium which are executed by circuitry of the computing machine or device.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism or medium for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Circuitry such as a processor subsystem may be used to execute the instructions provided on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture. In other examples, the processing circuitry may be embodied or provided by a data processing unit (DPU), infrastructure processing unit (IPU), acceleration circuitry, or combinations of graphical processing units (GPUs) or programmed FPGAs.

Figure 6:
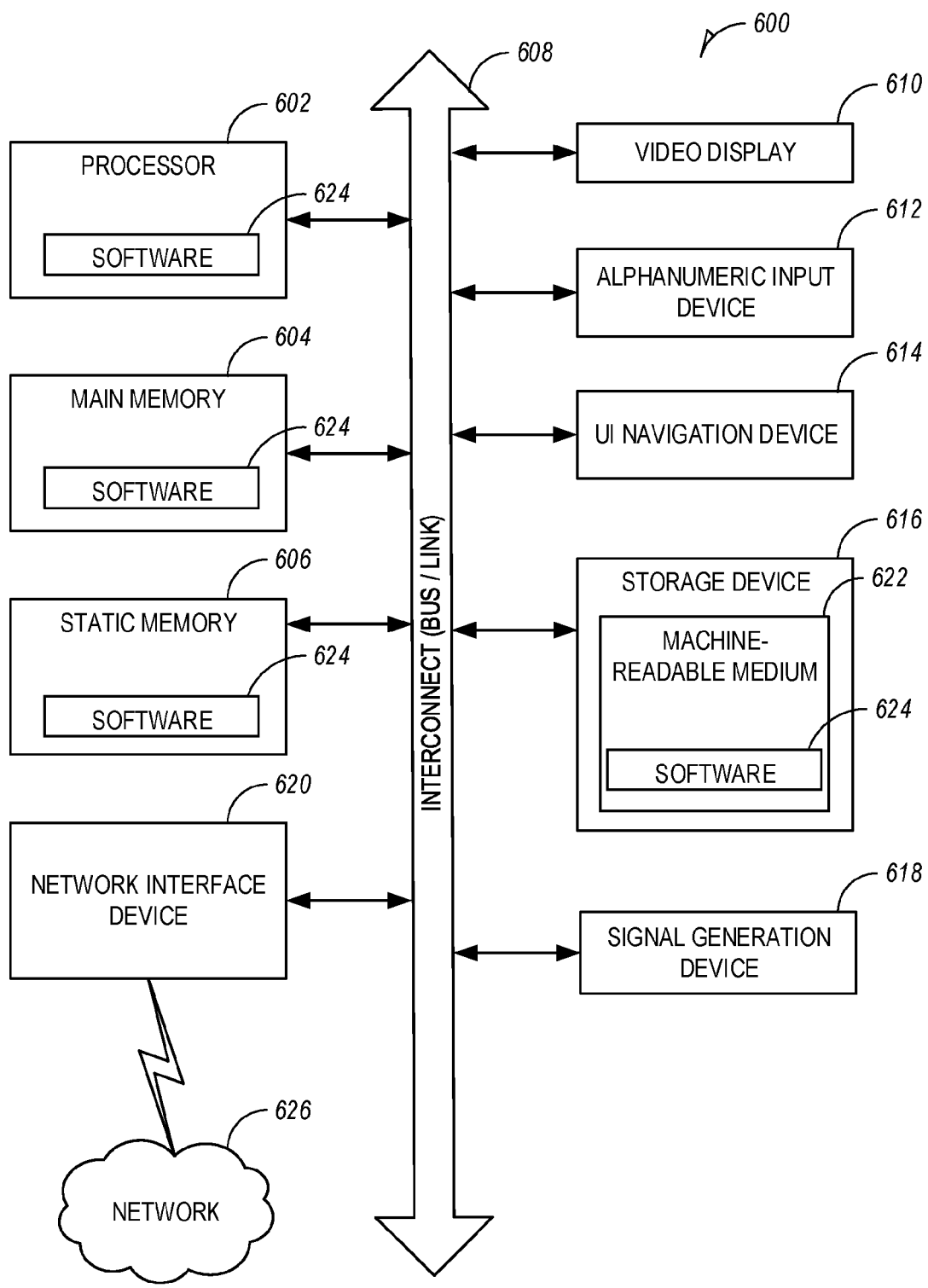
FIG. 6 illustrates a machine in the example form of a computer system, to perform any one of the methodologies discussed herein, according to an example.

FIG. 6 is a block diagram illustrating a machine in the example form of a computer system 600, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a vehicle subsystem or vehicle on-board computer, a personal computer (PC), a tablet PC, a hybrid tablet, a personal digital assistant (PDA), a mobile telephone or smartphone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, gyrometer, magnetometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or like networks). The term "transmission medium" shall be taken to include any intangible medium that is capable of storing, encoding, or carrying instructions for execution by the machine, and includes digital or analog communications signals or other intangible medium to facilitate communication of such software.

In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

In view of the disclosure above, a listing of various examples of embodiments is set forth below. It should be noted that one or more features of an example, taken in isolation or combination, should be considered to be within the disclosure of this application.

Example 1 is a method for automated data logging performed in a vehicle, comprising: obtaining data from at least one sensing component of the vehicle, the data provided during autonomous operation of the vehicle; detecting a dangerous situation based on the data, the dangerous situation occurring from a failure of the vehicle to comply with a safety criteria of a vehicle operational safety model; and logging the data in response to detection of the dangerous situation, including: storage of a first portion of the data in a public data store; and storage of a second portion of the data in a private data store, the second portion of the data having privacy-sensitive data, wherein the data stored in the private data store is encrypted, and wherein access to the private data store is controlled.

In Example 2, the subject matter of Example 1 optionally includes subject matter where the data from the at least one sensing component is used for safety decision-making by a planning system for the autonomous operation of the vehicle.

In Example 3, the subject matter of any one or more of Examples 1-2 optionally include subject matter where the first portion of the data stored in the public data store includes values for at least one of: longitudinal speed of the vehicle; lateral speed of the vehicle; lane position of the vehicle; throttle state of the vehicle; braking state of the vehicle; steering state of the vehicle; or posture state of the vehicle.

In Example 4, the subject matter of Example 3 optionally includes subject matter where the dangerous situation relates to a minimum safe distance requirement between the vehicle and a target vehicle, and wherein the first portion of the data stored in the public data store includes values for at least one of: longitudinal speed of the target vehicle; lateral speed of the target vehicle; longitudinal distance from the vehicle to the target vehicle; or lateral distance from the vehicle to the target vehicle.

In Example 5, the subject matter of any one or more of Examples 1-4 optionally include subject matter where the second portion of the data stored in the private data store includes at least one of: geographic position data of the vehicle; or camera data collected by at least one camera of the vehicle.

In Example 6, the subject matter of any one or more of Examples 1-5 optionally include subject matter where the data is logged in the public data store according to a first data structure and in the private data store according to a second data structure, and wherein the first and second data structures each include data fields for a time stamp and a vehicle identifier.

In Example 7, the subject matter of Example 6 optionally includes subject matter where a plurality of data records in the public data store and the private data store are organized into a respective data block, and wherein the respective data block corresponds to a digest calculated from a previous data block.

In Example 8, the subject matter of any one or more of Examples 1-7 optionally include subject matter where failure of the vehicle to comply with the safety criteria of the vehicle operational safety model is determined from at least one safety decision-making parameter, the at least one safety decision-making parameter including at least one of: longitudinal response time of the vehicle; lateral response time of the vehicle; maximum longitudinal acceleration of the vehicle; maximum lateral acceleration of the vehicle; or minimum longitudinal braking deceleration of the vehicle.

In Example 9, the subject matter of Example 8 optionally includes subject matter where a respective value for each of the at least one safety decision-making parameter is provided by a manufacturer of the vehicle.

In Example 10, the subject matter of any one or more of Examples 1-9 optionally include recording the data obtained from the at least one sensing component of the vehicle; wherein the data to be logged in response to detection of the dangerous situation includes data that is recorded during at least a first period of time before a start of the dangerous situation and recorded during at least a second period of time after the start of the dangerous situation.

In Example 11, the subject matter of Example 10 optionally includes subject matter where the first period of time is at least 90 seconds, and wherein the second period of time is at least 30 seconds.

In Example 12, the subject matter of any one or more of Examples 10-11 optionally include subject matter where the data is recorded with at least a 10 Hz sampling frequency.

Example 13 is at least one machine-readable storage medium comprising instructions that, when executed by at least one processor, cause the at least one processor to perform the methods of any of Examples 1 to 12.

Example 14 is an automated data logging system for a vehicle, the system comprising: an interface to provide data from at least one sensing component of the vehicle, the data provided during autonomous operation of the vehicle; and at least one processing device configured to perform the methods of any of Examples 1 to 12.

Example 15 is a vehicle, comprising an automated data logging system configured to perform the methods of any of Examples 1 to 12.

Example 16 is an automated data logging system for a vehicle, the system comprising: an interface to receive data from at least one sensing component of the vehicle, the data provided during autonomous operation of the vehicle; and at least one processing device configured to: obtain, via the interface, the data from the at least one sensing component of the vehicle; detect a dangerous situation based on the data, the dangerous situation occurring from a failure of the vehicle to comply with safety criteria of a vehicle operational safety model; and log the data in response to detection of the dangerous situation, including: storage of a first portion of the data in a public data store; and storage of a second portion of the data in a private data store, the second portion of the data having privacy-sensitive data, wherein the data stored in the private data store is encrypted, and wherein access to the private data store is controlled.

In Example 17, the subject matter of Example 16 optionally includes subject matter where the data from the at least one sensing component is used for safety decision-making by a planning system for the autonomous operation of the vehicle.

In Example 18, the subject matter of any one or more of Examples 16-17 optionally include subject matter where the first portion of the data stored in the public data store includes values for at least one of: longitudinal speed of the vehicle; lateral speed of the vehicle; lane position of the vehicle; throttle state of the vehicle; braking state of the vehicle; steering state of the vehicle; or posture state of the vehicle.

In Example 19, the subject matter of Example 18 optionally includes subject matter where the dangerous situation relates to a minimum safe distance requirement between the vehicle and a target vehicle, and wherein the first portion of the data stored in the public data store includes values for at least one of: longitudinal speed of the target vehicle; lateral speed of the target vehicle; longitudinal distance from the vehicle to the target vehicle; or lateral distance from the vehicle to the target vehicle.

In Example 20, the subject matter of any one or more of Examples 16-19 optionally include subject matter where the second portion of the data stored in the private data store includes at least one of: geographic position data of the vehicle; or camera data collected by at least one camera of the vehicle.

In Example 21, the subject matter of any one or more of Examples 16-20 optionally include subject matter where the data is logged in the public data store according to a first data structure and in the private data store according to a second data structure, and wherein the first and second data structures each include data fields for a time stamp and a vehicle identifier.

In Example 22, the subject matter of Example 21 optionally includes subject matter where a plurality of data records in the public data store and the private data store are organized into a respective data block, and wherein the respective data block corresponds to a digest calculated from a previous data block.

In Example 23, the subject matter of any one or more of Examples 16-22 optionally include subject matter where the failure of the vehicle to comply with the safety criteria of the vehicle operational safety model is determined from at least one safety decision-making parameter, the at least one safety decision-making parameter including at least one of: longitudinal response time of the vehicle; lateral response time of the vehicle; maximum longitudinal acceleration of the vehicle; maximum lateral acceleration of the vehicle; or minimum longitudinal braking deceleration of the vehicle.

In Example 24, the subject matter of Example 23 optionally includes subject matter where a respective value for each of the at least one safety decision-making parameter is provided by a manufacturer of the vehicle.

In Example 25, the subject matter of any one or more of Examples 16-24 optionally include the at least one processing device further configured to: record the data obtained from the at least one sensing component of the vehicle; wherein the data to be logged in response to detection of the dangerous situation includes data that is recorded during at least a first period of time before a start of the dangerous situation and recorded during at least a second period of time after the start of the dangerous situation.

In Example 26, the subject matter of Example 25 optionally includes subject matter where the first period of time is at least 90 seconds, and wherein the second period of time is at least 30 seconds.

In Example 27, the subject matter of any one or more of Examples 16-26 optionally include subject matter where the data is recorded with at least a 10 Hz sampling frequency.

Example 28 is at least one device-readable storage medium comprising instructions that, when executed by circuitry of an automated data logging device, cause the device to: obtain data from at least one sensing component of a vehicle, the data provided during autonomous operation of the vehicle; detect a dangerous situation based on the data, the dangerous situation occurring from a failure of the vehicle to comply with a safety criteria of a vehicle operational safety model; and log the data in response to detection of the dangerous situation, including: storage of a first portion of the data in a public data store; and storage of a second portion of the data in a private data store, the second portion of the data having privacy-sensitive data, wherein the data stored in the private data store is encrypted, and wherein access to the private data store is controlled.

In Example 29, the subject matter of Example 28 optionally includes subject matter where the data from the at least one sensing component is used for safety decision-making by a planning system for the autonomous operation of the vehicle.

In Example 30, the subject matter of any one or more of Examples 28-29 optionally include subject matter where the first portion of the data stored in the public data store includes values for at least one of: longitudinal speed of the vehicle; lateral speed of the vehicle; lane position of the vehicle; throttle state of the vehicle; braking state of the vehicle; steering state of the vehicle; or posture state of the vehicle.

In Example 31, the subject matter of Example 30 optionally includes subject matter where the dangerous situation relates to a minimum safe distance requirement between the vehicle and a target vehicle, and wherein the first portion of the data stored in the public data store includes values for at least one of: longitudinal speed of the target vehicle; lateral speed of the target vehicle; longitudinal distance from the vehicle to the target vehicle; or lateral distance from the vehicle to the target vehicle.

In Example 32, the subject matter of any one or more of Examples 28-31 optionally include subject matter where the second portion of the data stored in the private data store includes at least one of: geographic position data of the vehicle; or camera data collected by at least one camera of the vehicle.

In Example 33, the subject matter of any one or more of Examples 28-32 optionally include subject matter where the data is logged in the public data store according to a first data structure and in the private data store according to a second data structure, and wherein the first and second data structures each include data fields for a time stamp and a vehicle identifier.

In Example 34, the subject matter of Example 33 optionally includes subject matter where a plurality of data records in the public data store and the private data store are organized into a respective data block, and wherein the respective data block corresponds to a digest calculated from a previous data block.

In Example 35, the subject matter of any one or more of Examples 28-34 optionally include subject matter where failure of the vehicle to comply with the safety criteria of the vehicle operational safety model is determined from at least one safety decision-making parameter, the at least one safety decision-making parameter including at least one of: longitudinal response time of the vehicle; lateral response time of the vehicle; maximum longitudinal acceleration of the vehicle; maximum lateral acceleration of the vehicle; or minimum longitudinal braking deceleration of the vehicle.

In Example 36, the subject matter of Example 35 optionally includes subject matter where a respective value for each of the at least one safety decision-making parameter is provided by a manufacturer of the vehicle.

In Example 37, the subject matter of any one or more of Examples 28-36 optionally include the instructions further to cause the circuitry to: record the data obtained from the at least one sensing component of the vehicle; wherein the data to be logged in response to detection of the dangerous situation includes data that is recorded during at least a first period of time before a start of the dangerous situation and recorded during at least a second period of time after the start of the dangerous situation.

In Example 38, the subject matter of Example 37 optionally includes subject matter where the first period of time is at least 90 seconds, and wherein the second period of time is at least 30 seconds.

In Example 39, the subject matter of any one or more of Examples 37-38 optionally include subject matter where the data is recorded with at least a 10 Hz sampling frequency.

Example 40 is a system, comprising: means for obtaining data from at least one sensing component of a vehicle, the data provided during autonomous operation of the vehicle; means for detecting a dangerous situation based on the data, the dangerous situation occurring from a failure of the vehicle to comply with a safety criteria of a vehicle operational safety model; and means for logging the data in response to detection of the dangerous situation, to cause: storage of a first portion of the data in a public data store; and storage of a second portion of the data in a private data store, the second portion of the data having privacy-sensitive data, wherein the data stored in the private data store is encrypted, and wherein access to the private data store is controlled.

In Example 41, the subject matter of Example 40 optionally includes means for evaluating the data from the at least one sensing component for safety decision-making for the autonomous operation of the vehicle.

In Example 42, the subject matter of any one or more of Examples 40-41 optionally include means for identifying the first portion of the data stored in the public data store, that includes values for at least one of: longitudinal speed of the vehicle; lateral speed of the vehicle; lane position of the vehicle; throttle state of the vehicle; braking state of the vehicle; steering state of the vehicle; or posture state of the vehicle.

In Example 43, the subject matter of Example 42 optionally includes means for identifying the dangerous situation in relation to a minimum safe distance requirement between the vehicle and a target vehicle, and means for identifying the first portion of the data stored in the public data store, that includes values for at least one of: longitudinal speed of the target vehicle; lateral speed of the target vehicle; longitudinal distance from the vehicle to the target vehicle; or lateral distance from the vehicle to the target vehicle.

In Example 44, the subject matter of any one or more of Examples 40-43 optionally include means for identifying the second portion of the data stored in the private data store, that includes at least one of: geographic position data of the vehicle; or camera data collected by at least one camera of the vehicle.

In Example 45, the subject matter of any one or more of Examples 40-44 optionally include means for logging the data in the public data store according to a first data structure and in the private data store according to a second data structure, wherein the first and second data structures each include data fields for a time stamp and a vehicle identifier.

In Example 46, the subject matter of Example 45 optionally includes means for organizing a plurality of data records in the public data store and the private data store into respective data blocks, wherein each of the respective data blocks corresponds to a digest calculated from a respective previous data block.

In Example 47, the subject matter of any one or more of Examples 40-46 optionally include means for determining failure of the vehicle to comply with the safety criteria of the vehicle operational safety model, using at least one safety decision-making parameter, the at least one safety decision-making parameter including at least one of: longitudinal response time of the vehicle; lateral response time of the vehicle; maximum longitudinal acceleration of the vehicle; maximum lateral acceleration of the vehicle; or minimum longitudinal braking deceleration of the vehicle.

In Example 48, the subject matter of Example 47 optionally includes means for accessing a respective value for each of the at least one safety decision-making parameter, wherein each respective value is provided by a manufacturer of the vehicle.

In Example 49, the subject matter of any one or more of Examples 40-48 optionally include means for recording the data obtained from the at least one sensing component of the vehicle; wherein the data to be logged in response to detection of the dangerous situation includes data that is recorded during at least a first period of time before a start of the dangerous situation and recorded during at least a second period of time after the start of the dangerous situation.

In Example 50, the subject matter of Example 49 optionally includes means for sampling the data with at least a 10 Hz sampling frequency, wherein the first period of time is at least 90 seconds, and wherein the second period of time is at least 30 seconds.

Although these implementations have been described with reference to specific exemplary aspects, it will be evident that various modifications and changes may be made to these aspects without departing from the broader scope of the present disclosure.

What is claimed is:

1. At least one non-transitory machine-readable storage medium comprising instructions that, when executed by at least one processor, cause the at least one processor to perform operations for automated data logging in a vehicle, the operations comprising:

obtaining data from at least one sensing component of the vehicle, the data provided during autonomous operation of the vehicle;

detecting a dangerous situation based on the data, the dangerous situation occurring from a failure of the vehicle to comply with at least one of multiple safety criteria of a vehicle operational safety model, wherein the dangerous situation is detected from a violation of a minimum safe distance requirement between the vehicle and a target vehicle as defined by the vehicle operational safety model, and wherein the minimum safe distance requirement includes a minimum longitudinal distance and a minimum lateral distance between the vehicle and the target vehicle, wherein the minimum safe distance requirement is determined based on evaluation of at least one safety decision-making parameter in the vehicle operational safety model, and wherein the at least one safety decision-making parameter is defined or calculated according to physical characteristics of the vehicle; and logging the data in response to detection of the dangerous situation, including:

storage of a first portion of the data in a public data store; and storage of a second portion of the data in a private data store, the second portion of the data having privacy-sensitive data, wherein the data stored in the private data store is encrypted, and wherein access to the private data store is controlled.

2. The non-transitory machine-readable storage medium of claim 1, wherein the data from the at least one sensing component is used for safety decision-making by a planning system for the autonomous operation of the vehicle.

3. The non-transitory machine-readable storage medium of claim 1, wherein the first portion of the data stored in the public data store includes values for at least one of:
longitudinal speed of the vehicle;
lateral speed of the vehicle;
lane position of the vehicle;
throttle state of the vehicle;
braking state of the vehicle;
steering state of the vehicle; or
posture state of the vehicle.

4. The non-transitory machine-readable storage medium of claim 3, wherein the first portion of the data stored in the public data store includes values for at least one of:
longitudinal speed of the target vehicle;
lateral speed of the target vehicle;
longitudinal distance from the vehicle to the target vehicle; or
lateral distance from the vehicle to the target vehicle.

5. The non-transitory machine-readable storage medium of claim 1, wherein the second portion of the data stored in the private data store includes at least one of:
geographic position data of the vehicle; or
camera data collected by at least one camera of the vehicle.

6. The non-transitory machine-readable storage medium of claim 1, wherein the data is logged in the public data store according to a first data structure and in the private data store according to a second data structure, and wherein the first and second data structures each include data fields for a time stamp and a vehicle identifier;

wherein a plurality of data records in the public data store and the private data store are organized into a respective data block, and wherein the respective data block corresponds to a digest calculated from a previous data block.

7. The non-transitory machine-readable storage medium of claim 1, wherein the at least one safety decision-making parameter includes at least one of:
longitudinal response time of the vehicle;
lateral response time of the vehicle;
maximum longitudinal acceleration of the vehicle;
maximum lateral acceleration of the vehicle; or
minimum longitudinal braking deceleration of the vehicle;
wherein a respective value for each of the at least one safety decision-making parameter is provided by a manufacturer of the vehicle.

8. The non-transitory machine-readable storage medium of claim 1, further comprising:
recording the data obtained from the at least one sensing component of the vehicle;
wherein the data to be logged in response to detection of the dangerous situation includes data that is recorded during at least a first period of time before a start of the dangerous situation and recorded during at least a second period of time after the start of the dangerous situation.

9. The non-transitory machine-readable storage medium of claim 8, wherein the first period of time is at least 90 seconds, and wherein the second period of time is at least 30 seconds.

10. The non-transitory machine-readable storage medium of claim 8, wherein the data is recorded with at least a 10 Hz sampling frequency.

11. An automated data logging system for a vehicle, the system comprising:
an interface to receive data from at least one sensing component of the vehicle, the data provided during autonomous operation of the vehicle; and
at least one processing device configured to:
obtain, via the interface, the data from the at least one sensing component of the vehicle;
detect a dangerous situation based on the data, the dangerous situation occurring from a failure of the vehicle to comply with at least one of multiple safety criteria of a vehicle operational safety model, wherein the dangerous situation is detected from a violation of a minimum safe distance requirement between the vehicle and a target vehicle as defined by the vehicle operational safety model, and
wherein the minimum safe distance requirement includes a minimum longitudinal distance and a minimum lateral distance between the vehicle and the target vehicle, wherein the minimum safe distance requirement is determined based on evaluation of at least one safety decision-making parameter in the vehicle operational safety model, and wherein the at least one safety decision-making parameter is defined or calculated according to physical characteristics of the vehicle; and
log the data in response to detection of the dangerous situation, including:
storage of a first portion of the data in a public data store; and
storage of a second portion of the data in a private data store, the second portion of the data having privacy-sensitive data, wherein the data stored in the private data store is encrypted, and wherein access to the private data store is controlled.

12. The automated data logging system of claim 11, wherein the data from the at least one sensing component is used for safety decision-making by a planning system for the autonomous operation of the vehicle.

13. The automated data logging system of claim 8, wherein the first portion of the data stored in the public data store includes values for at least one of:
longitudinal speed of the vehicle;
lateral speed of the vehicle;
lane position of the vehicle;
throttle state of the vehicle;
braking state of the vehicle;
steering state of the vehicle; or
posture state of the vehicle.

14. The automated data logging system of claim 13, wherein the first portion of the data stored in the public data store includes values for at least one of:
longitudinal speed of the target vehicle;
lateral speed of the target vehicle;
longitudinal distance from the vehicle to the target vehicle; or
lateral distance from the vehicle to the target vehicle.

15. The automated data logging system of claim 11, wherein the second portion of the data stored in the private data store includes at least one of:
geographic position data of the vehicle; or
camera data collected by at least one camera of the vehicle.

16. The automated data logging system of claim 11, wherein the data is logged in the public data store according to a first data structure and in the private data store according to a second data structure, and wherein the first and second data structures each include data fields for a time stamp and a vehicle identifier;
wherein a plurality of data records in the public data store and the private data store are organized into a respective data block, and wherein the respective data block corresponds to a digest calculated from a previous data block.

17. The automated data logging system of claim 11, wherein the at least one safety decision-making parameter includes at least one of:
longitudinal response time of the vehicle;
lateral response time of the vehicle;
maximum longitudinal acceleration of the vehicle;
maximum lateral acceleration of the vehicle; or
minimum longitudinal braking deceleration of the vehicle;
wherein a respective value for each of the at least one safety decision-making parameter is provided by a manufacturer of the vehicle.

18. The automated data logging system of claim 11, the at least one processing device further configured to:
record the data obtained from the at least one sensing component of the vehicle;
wherein the data to be logged in response to detection of the dangerous situation includes data that is recorded during at least a first period of time before a start of the dangerous situation and recorded during at least a second period of time after the start of the dangerous situation.

19. The automated data logging system of claim 18, wherein the first period of time is at least 90 seconds, and wherein the second period of time is at least 30 seconds.

20. The automated data logging system of claim 11, wherein the data is recorded with at least a 10 Hz sampling frequency.

* * * * *